Figure 1:
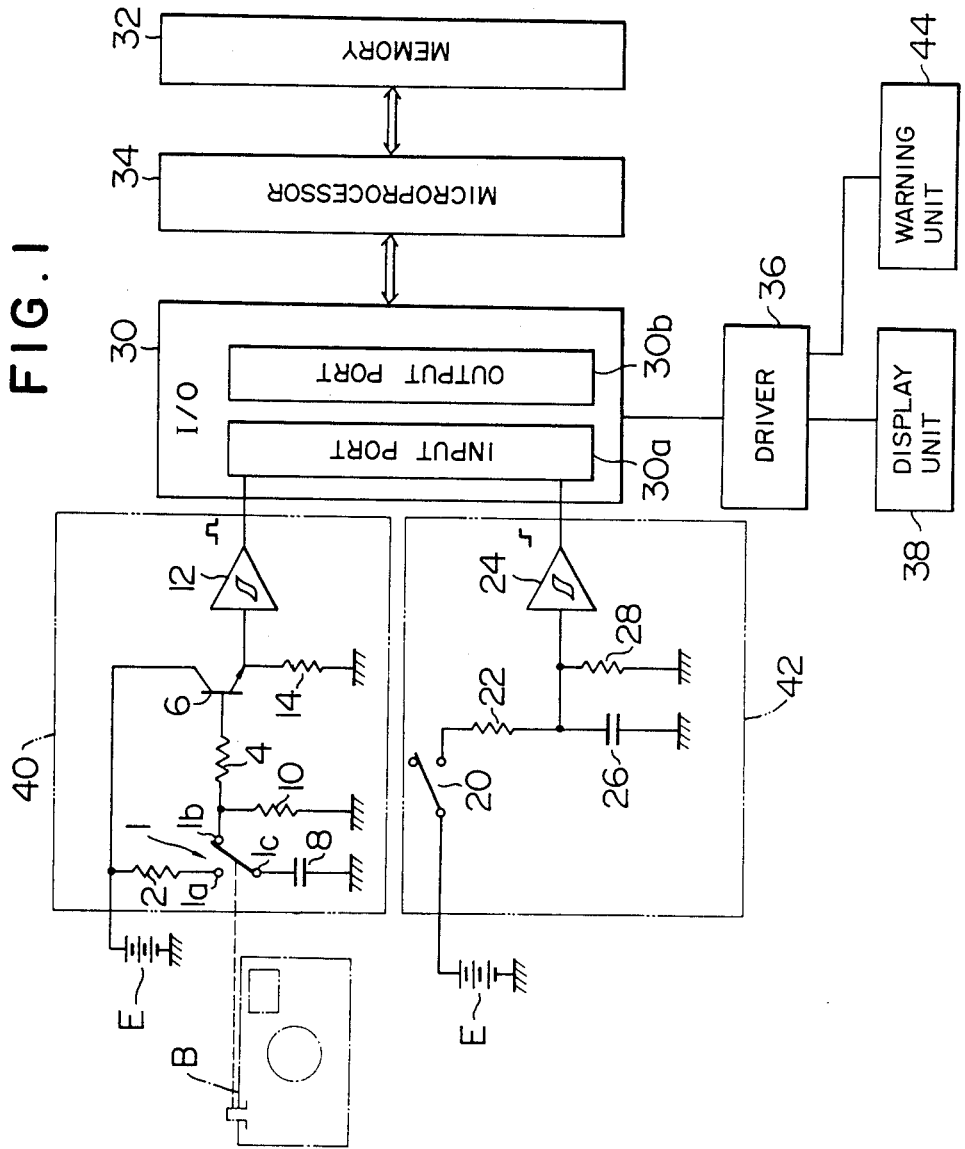

United States Patent [19]

Yokoo

[11] Patent Number: 4,525,055
[45] Date of Patent: Jun. 25, 1985

[54] PHOTOGRAPHIC CAMERA HAVING BATTERY REMAINING LIFE INDICATING MEANS

[75] Inventor: Hirokazu Yokoo, Tokyo, Japan

[73] Assignee: Fuji Photo Film Co., Ltd., Minami-Ashicara, Japan

[21] Appl. No.: 630,948

[22] Filed: Jul. 16, 1984

[30] Foreign Application Priority Data

Jul. 15, 1983 [JP] Japan .................... 58-129223

[51] Int. Cl.³ .................... G03B 17/18; G08B 21/00
[52] U.S. Cl. .................... 354/468; 354/127.1; 340/636; 320/48
[58] Field of Search ............ 354/468, 127.1, 127.12, 354/289.1, 289.12; 340/636, 663; 320/48

[56] References Cited

FOREIGN PATENT DOCUMENTS 58-46332  3/1983  Japan .................... 354/468

Primary Examiner—William B. Perkey
Attorney, Agent, or Firm—Brumbaugh, Graves, Donohue & Raymond

[57] ABSTRACT

A battery remaining life indicating means for photographic cameras which are provided with systems operated under electric power supplies from batteries and have at least two photographing modes of different power consumptions, said indicating means comprising battery life memorizing means having a memory of a battery life in terms of number of possible exposures under a first photographing mode which is calculated on the basis of capacity of battery loaded in the camera and the power consumption under the first photographing mode, modifying factor memorizing means having a memory of a modifying factor which is the power consumption under a second photographing mode measured taking the power consumption under the first photographing mode as a unit, battery life display means for displaying the battery life memorized in the battery life memorizing means, photographing exposure detecting means, photographing mode discriminating means, operating means responsive to said photographing exposure detecting means to rewrite the memory of the battery life in said battery life memorizing means by subtracting one when the discriminating means detects the first photographing mode and by subtracting said modifying factor when the discriminating means detects the second photographing mode.

7 Claims, 2 Drawing Figures

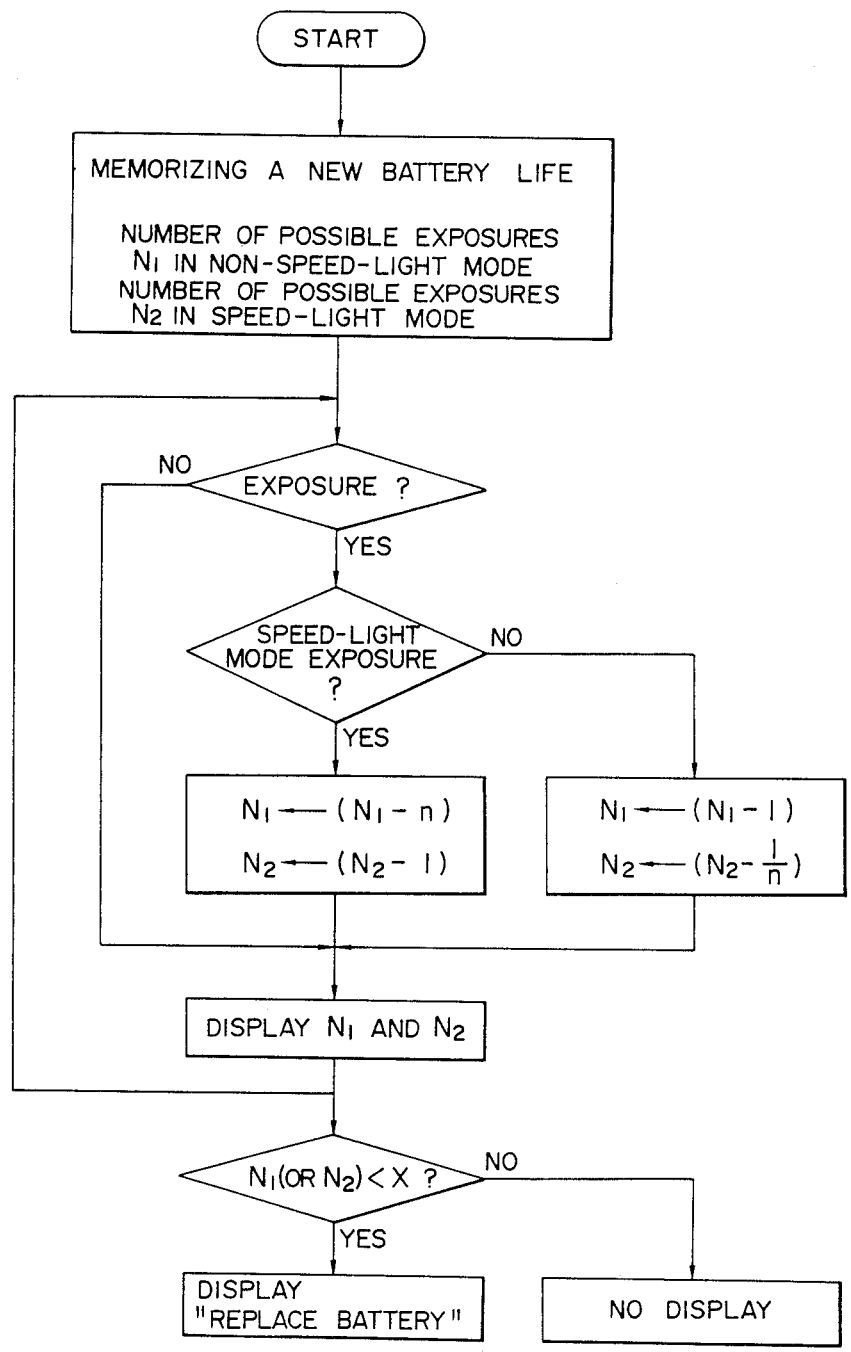

PHOTOGRAPHIC CAMERA HAVING BATTERY REMAINING LIFE INDICATING MEANS

The present invention related to photographic cameras having electric devices, and more particularly, to battery remaining life indicating means for such cameras.

In recent years, there are various types of photographic cameras having electric devices such as automatic exposure control systems, automatic focusing systems and film take up system. In such cameras, it is important to know when batteries are to be exhausted. There have, therefore, required for cameras to have functions of indicating battery life or battery replacement time.

For the purpose, in Japanese Preliminary publication of patent No. 58-46332 published on Mar. 17, 1983, there is proposed a battery replacement time indicator, wherein number of exposures which one can take photographs with one set of battery is memorized and number of exposures are counted on each taking after the battery is roaded. The indicator functions to compare the memorized number of exposures with the counted number of exposures and gives a warning to indicate that the battery shall be replaced with the latter becomes close to the former. It should, however, be noted that the indicator of the aforementioned type cannot conveniently be adapted to cameras comprising speed-light or electronic flash systems sharing battery power with the other electric systems since there is no difference between the counts of exposures with and without the electronic flashing. In view of the fact that photographing with electronic flashing has a higher power consumption, the aforementioned indicator cannot precisely indicate the remining life of the battery.

As an alternative type, there has been an indicating system which is designed to measure a voltage in a dummy current circuit and produce a warning when the voltage decreases below a predetermined level. However, this indicator is disadvantageous in that it does not indicate the battery life level and the battery replacement time is not indicated correctly because the voltage of the battery varies depending upon the temperature of its environment.

It is therefore an object of the present invention to provide a battery remaining life indicator for a photographic camera which can correctly indicate the battery remaining life.

Another object of the present invention is to provide battery remaining life indicating means which makes indications in terms of possible number of exposures.

A further object of the present invention is to provide battery remaining life indicating means which can provide accurate indications taking into account, modes of exposure such as with or without electric flashing.

Another object of the present invention is to provide a battery life indicator for a camera which is not affected by the temperature of its environment.

A further object of the present invention is to provide a battery remaining life indicator for a camera which can indicate battery life in terms of number of exposures possible in different exposure modes.

According to the present invention, the above and other object can be accomplished by battery remaining life indicating means for photographic cameras which are provided with systems operated under electric power supplies from batteries and have at least two photographing modes of different power consumptions, said indicating means comprising battery life memorizing means having a memory of a battery life in terms of number of possible exposures under a first photographing mode which is calculated on the basis of capacity of battery loaded in the camera and the power consumption under the first photographing mode, modifying factor memorizing means having a memory of a modifying factor which is the power consumption under a second photographing mode measured taking the power consumption under the first photographing mode as a unit, battery life display means for displaying the battery life memorized in the battery life memorizing means, photographing exposure detecting means, photographing mode discriminating means, operating means responsive to said photographing exposure detecting means to rewrite the memory of the battery life in said battery life memorizing means by subtracting one when the discriminating means detects the first photographing mode and by subtracting said modifying factor when the discriminating means detects the second photographing mode. In a preferable aspect of the present invention, the first photographing mode is a photographing without electronic flashing and the second photographing mode is a photographing with an electronic flashing. It should however be noted that the first photographing mode may be a photographing under an electronic flashing and the second photographing mode may be a non-flashing photographing. In this instance, the display is made in terms of the number of possible exposures with electronic flashing. The modifying factor may then be a fractional number so that the memory may include a fractional number. However, display may be made by an integral number omitting the fraction.

According to another aspect of the present invention, the battery remaining life indicating means further includes second battery life memorizing means having a memory of a battery life in terms of number of possible exposures under the second photographing mode which is calculated on the basis of the capacity of the battery and the power consumption under the second photographing mode, said memory in said second battery life memorizing means being displayed by said display means, said operating means having means responsive to said exposure detecting means to rewrite the memory of the battery life in said second battery life memorizing means by subtracting one divided by said modifying factor when the discriminating means detects the first photographing mode and by subtracting one when the discriminating means detects the second photographing mode.

The above and other objects and features of the present invention will become apparent from the following descriptions of preferred embodiment with reference to the accompanying drawings, in which:

FIG. 1 is a circuit diagram showing the battery remaining life indicating means in accordance with one embodiment of the present invention; and FIG. 2 is a flow chart showing the operation of a microprocessor.

Referring now to the drawings, particularly to FIG. 1, there is a circuit which comprises an exposure detector 40, a mode discriminating unit 42 which discriminates exposures under a speed-light mode from exposures under a non-speed light exposure, an input-output port (hereinafter we say it as I/O port) 30 connected with the exposure detector 40 and the mode discriminating unit 42, a microprocessor 34 connected with the I/O port 30, a memory 32 connected with the microprocessor 34, a driver 36 connected with the I/O port 30, a display unit 38 connected with the driver 36, and a warning unit 44 connected with the driver 36.

The exposure detector 30 includes a switch 1 interconnected with a shutter release button B of a camera. The switch 1 has a normally closed contact 1a and a normally open contact 1b which are alternately connected with a common terminal 1c. When the shutter release button B is not depressed, the contact 1a is connected with the common terminal 1c, while the contact 1b is connected with the terminal 1c when the shutter release button B is depressed.

The contact 1a of the switch 1 is connected with a power source E through a resistor 2, the contact 1b is grounded through a resistor 10. Further, the contact 1b is connected with the base of a transistor 6 through a resistor 4. The common terminal 1c is grounded through a capacitor 8. The transistor 6 has a collector which is connected with the power source E, and an emitter which is connected with an input terminal of a schmidt trigger 12. Further, the emitter of the transistor 6 is grounded through a resistor 14.

The capacitor 8 is normally charged by the power source E through a resistor 2 and the normally closed contact 1a of the switch 1. When the shutter release button B is depressed, the common terminal 1c is connected with the contact 1b, so that the charge of the capacitor 8 is applied to the base of the transistor 6 turning on the transistor 6. Thus, the schmidt trigger 12 is applied with an input and produces an output pulse of which duration depends on the discharge time of the capacitor 8. The output of the schmidt trigger 12 is applied to an input port 30a of the I/O 30.

The mode discriminating unit 42 includes a normally open switch 20 linked with a speed-light or electric flash switch. The switch 20 is connected on one hand with the power source E and on the other hand with an input terminal of a schmidt trigger 24 through a resistor 22. The input terminal is grounded through parallelly connected resistor 28 and capacitor 26.

When the speed-light switch is turned on, the switch 20 is closed so that the schmidt trigger 24 is applied with an input voltage and produces a high level signal which is applied to the input port 30a of the I/O port 30. Thus, the mode discriminating unit 42 produces a high level signal in a photographing under the speed-light mode and a low level signal in a photographing under the non-speed-light mode.

The memory circuit 32 has a memory of an operating program for the microprocessor 34 as shown in FIG. 2. The memory circuit 32 also has a memory of a battery life $N_1$ in terms of number of possible exposures under non-flash mode photographing. It further has a memory of a battery life $N_2$ in terms of number of possible exposures under an electronic flash mode photographing. The number of possible exposures under the non-flash mode is calculated on the basis of the capacity of the battery E and the power consumption in a single shot of photographing without flashing. Similarly, the number of possible exposures under the flashing mode is calculated on the basis of the capacity of the battery E and the power consumption in a single shot of photographing with the electronic flashing. The memory circuit 32 further includes a memory of a modifying factor n which is the power consumption in a single shot exposure under the electronic flashing mode taking the power consumption in a single shot exposure under the non-flashing mode. The values $N_1$, $N_2$ and n are all integers.

The driver 36 operates the display unit 38 and the warning unit 44 depending on the output from the output port of the I/O port 30. The display unit 38 displays the remaining life of the battery. The warning unit 44 displays the words "REPLACE BATTERY" when the battery remaining life is below a predetermined value.

Operation of the microprocessor 34 will now be described with reference to FIG. 2. When a new battery is loaded, the microprocessor 34 makes the memory circuit 32 memorize the battery lives $N_1$ and $N_2$ which are predetermined in accordance with the type of the battery. The microprocessor 34 receives the output of the detector 40 through the I/O port 30 and judges as to whether or not an exposure has been made. If no exposure has been made, the battery lives $N_1$ and $N_2$ are supplied as they are to the driver 36 to be displayed by the display unit 38. If an exposure has been made, the microprocessor 34 judges whether the exposure is of an electronic flashing mode or of a non-flashing mode in accordance with the output of the mode discriminating unit 42.

When it is judged that the exposure was of the speedlight or electronic flashing mode, the battery lives $N_1$ and $N_2$ memorized in the memory circuit 32 are submitted by $(N_1-n)$ and $(N_2-1)$, respectively. The battery lives as submitted are displayed on the display unit 38. Any decimal fraction of the battery life $(N_2-1/n)$ may be omitted in the display.

Thereafter, the microprocessor 34 reads the battery life values and compare it with a predetermined warning value which has in advance been memorized in the memory circuit 32 to judge whether or not anyone of the battery lives $N_1$ and $N_2$ are less than the warning value. When one of the battery lives $N_1$ and $N_2$ is less than the warning value, the warning unit 44 is energized to make of a display of "REPLACE BATTERY". When the battery life is not less than the warning value, the warning unit 44 is not energized.

Assuming that a lithium battery is loaded in an auto-exposure, auto-focusing and auto-winding camera having an electronic flash, the consumption of the battery capacity for one shot of electronic flashing mode exposure is 10 times (n=10) as large as that of non-flashing mode exposure. The capacity of a new lithium battery is such that 2000 shots can usually be made in non-flashing mode photographing so that the battery life $N_1$ is started at 2000. The capacity of a new lithium battery also allows 200 shots under the electronic flashing mode so that the battery life $N_2$ is started at 200. The warning unit 44 may produce a warning that battery should be replaced when the battery life $N_1$ is decreased below 50.

The invention has thus been shown and described with reference to a specific embodiment, however, it should be noted that the invention is in no way limited to the detailed of the illustrated arrangements but changes and modifications may be made without departing from the scope of the appended claims.

I claim:

1. A battery remaining life indicating means for photographic cameras which are provided with systems operated under electric power supplies from batteries and have at least two photographing modes of different power consumptions, said indicating means comprising battery life memorizing means having a memory of a battery life in terms of number of possible exposures under a first photographing mode which is calculated on the basis of capacity of battery loaded in the camera and the power consumption under the first photographing mode, modifying factor memorizing means having a memory of a modifying factor which is the power consumption under a second photographing mode measured taking the power consumption under the first photographing mode as a unit, battery life display means for displaying the battery life memorized in the battery life memorizing means, photographing exposure detecting means, photographing mode discriminating means, operating means responsive to said photographing exposure detecting means to rewrite the memory of the battery life in said battery life memorizing means by subtracting one when the discriminating means detects the first photographing mode and by subtracting said modifying factor when the discriminating means detects the second photographing mode.

2. A battery life level indicator in accordance with claim 1 in which one of said exposure modes is a speed-light mode and the other is a non-speed-light mode.

3. A battery remaining life indicating means in accordance with claim 1 in which said battery remaining life indicating means further includes second battery life memorizing means having a memory of a battery life in terms of number of possible exposures under the second photographing mode which is calculated on the basis of the capacity of the battery and the power consumption under the second photographing mode, said memory in said second battery life memorizing means being displayed by said display means, said operating means having means responsive to said exposure detecting means to rewrite the memory of the battery life in said second battery life memorizing means by subtracting one divided by said modifying factor when the discriminating means detects the first photographing mode and by subtracting one when the discriminating means detects the second photographing mode.

4. A battery remaining life indicating means for photographic cameras which are provided with systems operated under electric power supplies from batteries and have at least two photographing modes of different power consumptions, said indicating means comprising first battery life memorizing means having a memory of a battery life in terms of number of possible exposures under a first photographing mode which is calculated on the basis of capacity of battery loaded in the camera and the power consumption under the first photographing mode, the second battery life memorizing means having a memory of a battery life in terms of number of possible exposures under the second photographing mode which is calculated on the basis of the capacity of the battery and the power consumption under the second photographing mode, modifying factor memorizing means having a memory of a modifying factor which is the power consumption under the second photographing mode measured taking the power consumption under the first photographing mode as a unit, battery life display means for displaying the battery lives memorized in the first and second battery life memorizing means, photographing exposure detecting means, photographing mode discriminating means, operating means having first means responsive to said photographing exposure detecting means to rewrite the memory of the battery life in said first battery life memorizing means by subtracting one when the discriminating means detects the first photographing mode and by subtracting said modifying factor when the discriminating means detects the second photographing mode, and second means responsive to said exposure detecting means to rewrite the memory of the battery life in said second battery life memorizing means by subtracting one divided by said modifying factor when the discriminating means detects the first photographing mode and by subtracting one when the discriminating means detects the second photographing mode.

5. A battery life level indicator in accordance with claim 4 in which said battery life display means omits decimal fraction of the battery life in the display.

6. A battery life level indicator in accordance with claim 4 in which said photographing exposure detecting means includes a switch interconnected with a shutter release button of a camera and having a normally closed contact and a normally open contact which are alternately connected with a common terminal, a resistor $R_1$ connected on one hand with said normally closed contact and on the other hand with a power source, a resistor $R_2$ on one hand grounded and connected on the other hand with said normally open contact, a resistor $R_3$ connected with said normally open contact, a transistor having an emitter, a base connected with said resistor $R_3$ and a collector connected with said power source, a capacitor on one hand grounded and connected on the other hand with said common terminal, a schmidt trigger having an input terminal connected with said emitter and an output terminal connect with said operating means, and a resistor $R_4$ on one hand grounded and connected on the other hand with said emitter, whereby said capacitor is normally charged by the power source through said resistor $R_1$ and said normally closed contact, said common terminal is connected with said normally open contact due to depression of the shutter release button, so that the charge of said capacitor is applied to said base turning on said transistor, said schmidt trigger is applied with an input and produces an output pulse of which duration depends on the discharge time of said capacitor, and the output pulse is applied to said operating means.

7. A battery life level indicator in accordance with claim 4 in which said mode discriminating unit includes a schmidt trigger, a resistor $R_5$, a normally open switch linked with an electric flash switch and connected on one hand with a power source and on the other hand with the input terminal of said schmidt trigger through said resistor $R_5$, a resistor $R_6$ on one hand grounded and connected on the other hand with said input terminal, and a capacitor parallelly connected with said resistor $R_6$, whereby said normally open switch is closed due to turning on of said electric flash switch, so that said schmidt trigger is applied with an input voltage and produces a high level signal which is applied to said operating means.

* * * * *